J. ORMISTON.
Plow.
No. 5,750.
Patented Sept. 5, 1848.
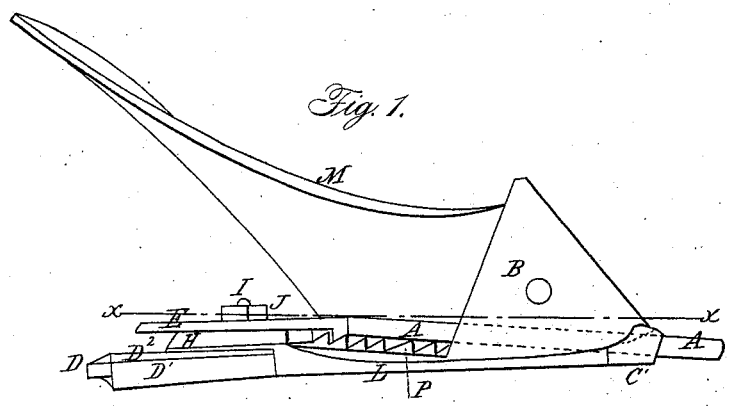
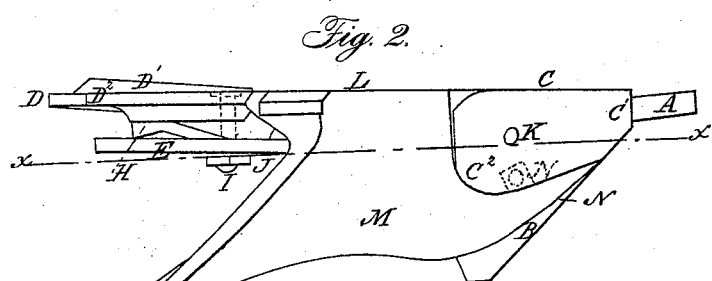
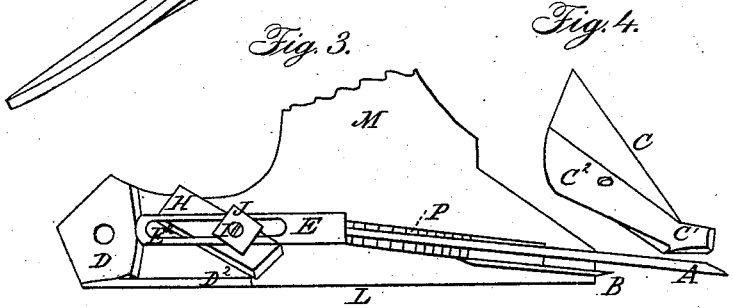
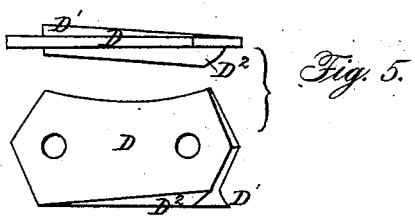

UNITED STATES PATENT OFFICE.

JNO. ORMISTON, OF WATERFORD, OHIO.

IMPROVEMENT IN PLOWS.

Specification forming part of Letters Patent No. 5,750, dated September 5, 1848.

*To all whom it may concern:*

Be it known that I, JOHN ORMISTON, of Waterford, in the county of Washington and State of Ohio, have invented a new and useful Improvement in Self-Sharpening Plows; and I do hereby declare that the following is a full, clear, and exact description of the principle or character thereof which distinguishes it from all other things before known, and of the manner of constructing and using the same, reference being had to the annexed drawings, making part of this specification.

Figure 1 represents the bottom. Fig. 2 represents a top view; Fig. 3, a cut through the line $x$ $x$ of Figs. 1 and 2; Fig. 4, cutter (detached;) Fig. 5, views of renovator (detached) of plow.

Similar letters in the several figures refer to corresponding parts.

The plow is to be cast all together, with the exception of the point A, share B, front piece or cutter C, renovator D, and dog or stop E.

The point A may be made of cast or wrought metal, a straight bar about seventeen inches long for the medium size, one and a quarter wide, and five-eighths thick, with one or both ends forming a perfect plow-point capable of being turned over and reversing ends at pleasure, passing through the nose of the plow and resting against the stop E.

The share B may be wrought or cast metal, its form being a triangle, (with the angles cut off one and a half inch,) each side capable of being turned over and reversed at pleasure, secured by a screw-bolt passing through the center and fastened by a nut, N, to the mold-board.

The front piece, C, may be cast with or without a cutter, and forms the nose of the plow, being made tubular at $c'$ for the point A to pass through, having a wing, $c^2$, passing over the nut N, (represented by dotted lines,) which secures the share B, and is secured by a screw-bolt, K, passing through the mold-board and a nut on the inside.

The renovator D may be cast in the form represented in Fig. 5, with two lips, D' D', one on the opposite edge to the other, and capable of having its ends reversed, bringing either of the flanges at work at pleasure, secured to the landside by a screw-bolt, I, passing through the handle and dog or stop and nut or thumb-screw, the ends of said renovator being made of an obtuse-angled shape, beveling on opposite sides.

The stop or dog E may be cast with a slit, $E^2$, six inches long, about three-fourths of an inch wide, through which the screw end of a bolt, I, (passing through the renovator D and handle H,) passes, and is regulated by a thumb screw or nut, J, said stop E acting on the notched flange or plate P (which is cast solid to the landside L) by moving it from notch to notch by loosening the thumb-screw J, and thereby regulating the length of the point at pleasure, altogether forming a complete self-sharpening plow.

What I claim as my invention or improvement is—

The combination of the notched plate P and slotted hook-stop E for adjusting and holding the point A, and the manner in which the point passes through the front piece, C, and is regulated by the notched plate P and dog or stop E, and in combination therewith the tubular nose C', made with a flange, $C^2$, and cutter C, as described.

In testimony whereof I have hereunto signed my name before two subscribing witnesses this 29th day of July, 1848.

JOHN ORMISTON.

Witnesses:
JAMES ANDERSON,
ENOS W. SLATER.